United States Patent [19]

Lyle

[11] Patent Number: 5,721,739
[45] Date of Patent: Feb. 24, 1998

[54] METHOD FOR DETECTING READ ERRORS, CORRECTING SINGLE-BIT READ ERRORS AND REPORTING MULTIPLE-BIT READ ERRORS

[75] Inventor: James D. Lyle, Santa Clara, Calif.

[73] Assignee: Fairchild Semiconductor Corporation, South Portland, Me.

[21] Appl. No.: 572,070

[22] Filed: Dec. 14, 1995

[51] Int. Cl.$^6$ ........................................... G06F 11/10
[52] U.S. Cl. .................. 371/37.4; 371/37.7; 371/40.11
[58] Field of Search ........................ 371/37.4, 37.7, 371/40.1

[56] References Cited

U.S. PATENT DOCUMENTS

| | | | |
|---|---|---|---|
| 4,549,298 | 10/1985 | Creed et al. | 371/37.7 |
| 4,617,664 | 10/1986 | Aichelmann, Jr. et al. | 371/37.7 |
| 4,785,451 | 11/1988 | Sako et al. | 371/37.4 |
| 5,157,669 | 10/1992 | Yu et al. | 371/37.7 |

Primary Examiner—Stephen M. Baker
Attorney, Agent, or Firm—Limbach & Limbach

[57] ABSTRACT

Read errors in data transferred from a remote memory to a buffer memory are detected and corrected by a series of error detection and correction techniques. In the present invention, the transferred data includes user data, a checksum that detects read errors in the user data, row and column syndromes that identifies read errors in the user data, and a Hamming code that identifies read errors in the row and column syndromes. To minimize any performance degradation, a checksum is initially calculated from the user data and compared with the stored checksum. If an error is detected, a Hamming code is calculated from the stored row and column syndromes and compared with the stored Hamming code. Corrections are made, as needed, and then row and column syndromes are calculated from the user data. The calculated row and column syndromes are then compared with the stored row and column syndromes the identify and correct single-bit read errors, and report multiple-bit read errors.

20 Claims, 3 Drawing Sheets

METHOD FOR DETECTING READ ERRORS, CORRECTING SINGLE-BIT READ ERRORS AND REPORTING MULTIPLE-BIT READ ERRORS

BACKGROUND OF THE INVENTION

1. Field of the Invention

The present invention relates to error detection and correction and, in particular, to a method for detecting read errors, correcting single-bit read errors and reporting multiple-bit read errors.

2. Description of the Related Art

Flash memory devices are very reliable and read failures of a properly programmed location are exceedingly rare. Still, the cost of a read failure in terms of lost data and user frustration is so high that some form of "insurance" is usually a wise investment.

With flash memory in general, most read failures fall into one of three categories. First, a read failure can occur when a programmed cell suffers from excess leakage. In this case, the charge on the cell "bleeds off" over time. Second, the programming of one cell may disturb (alter) the data programmed into an adjacent cell. Finally, failures can also occur when the number of read cycles has exceeded a (very large) critical number of cycles.

To recover data lost due to read failures, error detection and correction (EDC) methods are perhaps the best mechanisms that can be used. There are many types of EDC methods that are available, thus a generic discussion of the science is far beyond the scope of this section. There are, however, a few important points that warrant attention.

First, the EDC method must correct single bit failures and, in addition, detect multiple bit failures. Otherwise the codes might be used to blindly correct one error and return "good" data, unaware that another error lies hidden inside. While it is bad to lose data, it can be even worse to use corrupted data without knowing it.

Second, the actual bits generated by the EDC method, known as syndrome bits, must also be protected. If the syndrome bits are not protected, then an error in the syndrome bits might be misinterpreted as a correctable error in the data. The EDC method would then "correct" data that did not need to be corrected, thereby corrupting the data in the process.

Additional issues relating to EDC methods are storage and performance overhead. Minimally, the number of bits required to protect N bits is approximately equal to $\log_2(N)$ +1. Thus, to protect 16 Mbits, theoretically only about 25 syndrome bits are required.

Such a scheme, however, is almost certainly impractical. As the size of the area protected increases, the odds of a multiple (uncorrectable) bit error also increase. In addition, the complexity of the calculations required to generate the syndrome bits increases, often geometrically. The syndrome bits must be re-calculated any time the protected data changes, and if this calculation is too complex, performance will be degraded to unacceptable levels.

To reduce the risk of multiple bit errors and performance degradation, the storage area is usually broken into smaller and more manageable "fragments" that have their own dedicated syndrome bits. Unfortunately, this approach increases the storage area consumed by the syndrome bits.

Finally, it is noted that read transfers outnumber write transfers. This implies a relative priority of operations. Error detection (done on each read) must be very quick and efficient. Error code generation (done on each write) must be fast too, but is less crucial. Error correction is infrequent, so extra time spent here will not seriously affect performance.

Thus, there is a need for an EDC method that satisfies the requirements noted above.

SUMMARY OF THE INVENTION

The present invention provides an error correction and detection (EDC) method for detecting read errors, correcting single-bit read errors, and reporting multiple-bit read errors that both protects the actual bits generated by the EDC method and requires minimal storage and performance overhead. In the preferred embodiment of the present invention, no storage overhead is required.

The method of the present invention includes the step of transferring data from a remote memory to a buffer memory. In the present invention, the transferred data includes a sector of stored user data, a stored first error code usable in correcting an error in the sector of stored user data, a stored second error code usable in correcting an error in the stored first error code, and a stored third error code usable in detecting an error in the sector of stored user data.

The method continues with the step of forming a calculated third error code from the sector of stored user data, followed by the step of comparing the calculated third error code to the stored third error code. Next, a calculated second error code is formed from the stored first error code if the calculated third error code does not match the stored third error code. Following this, the calculated second error code is compared to the stored second error code to detect an error in the stored second error code.

A better understanding of the features and advantages of the present invention will be obtained by reference to the following detailed description and accompanying drawings which set forth an illustrative embodiment in which the principals of the invention are utilized.

DETAILED DESCRIPTION

Figure 1A:
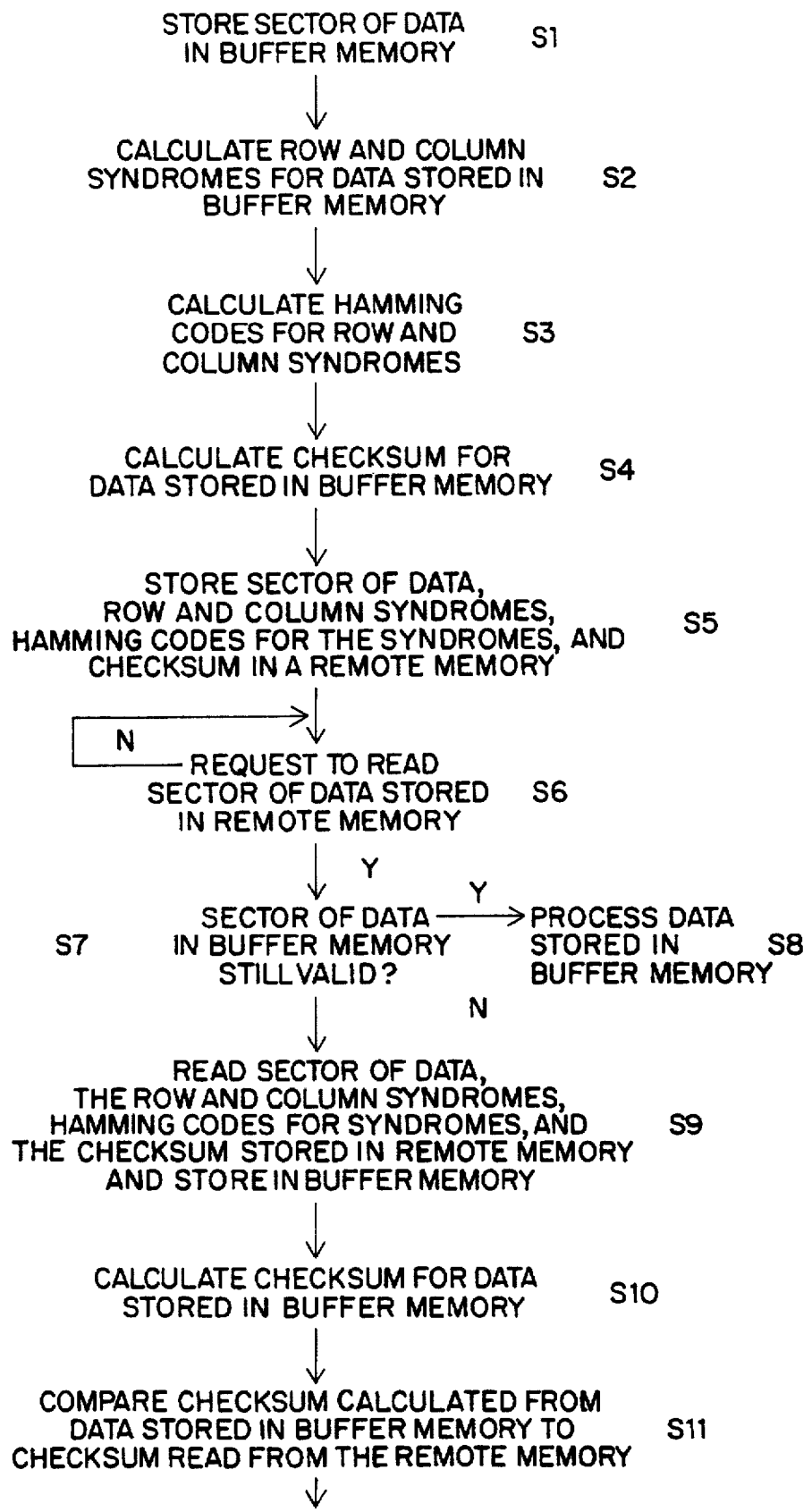
FIGS. 1A–1B are flow charts illustrating a method for detecting read errors, correcting single-bit read errors, and reporting multiple-bit read errors in accordance with the present invention.
Figure 1B:
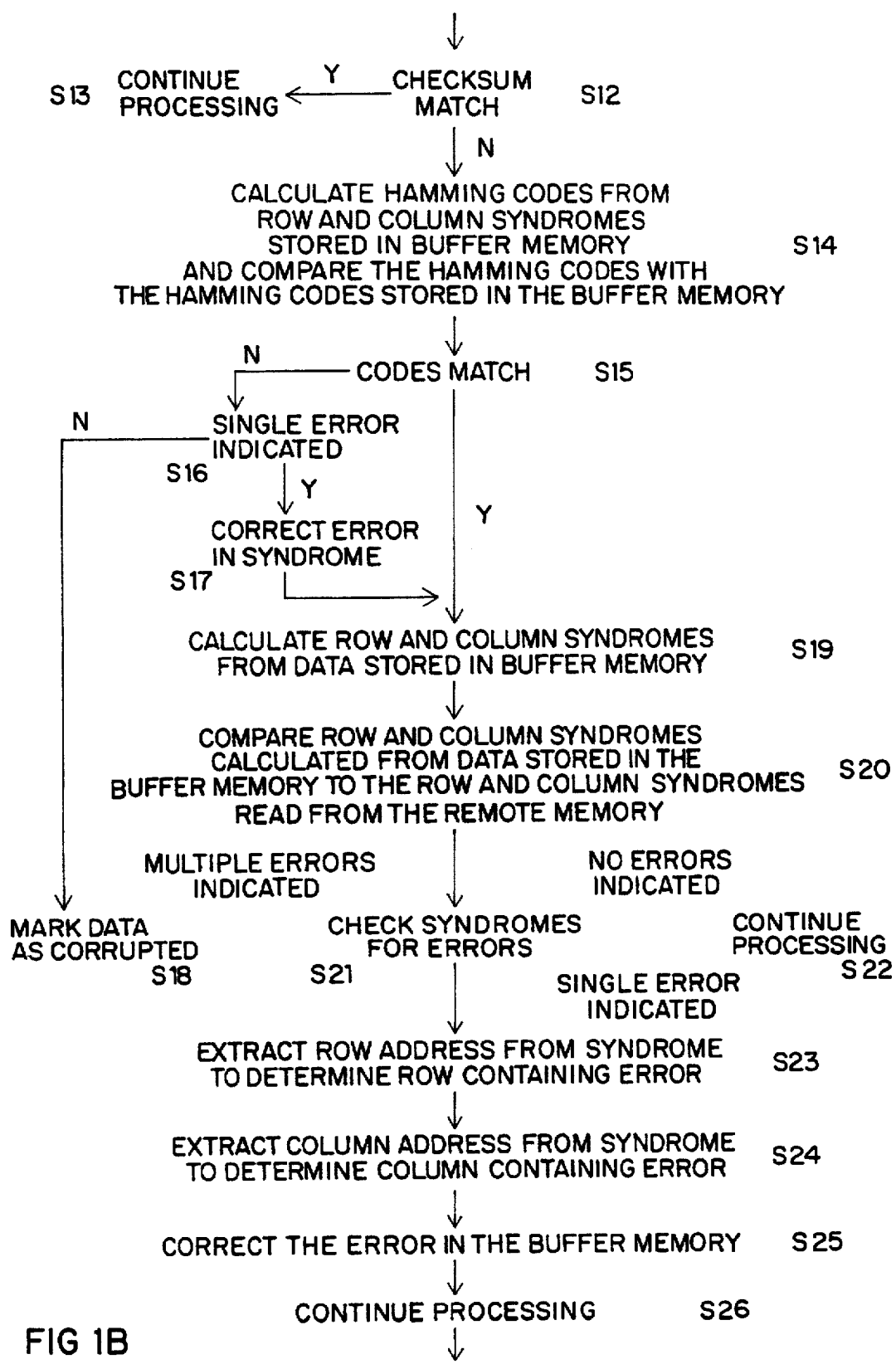

FIGS. 1A–1B show a flow chart that illustrates a method for detecting read errors, correcting single-bit read errors, and reporting multiple-bit read errors in accordance with the present invention. As described in greater detail below, the method determines whether data, which was transferred from a remote memory to a buffer memory, was transferred without an error.

If the transfer was made without an error, the method continues with normal processing. However, if an error is detected in the transferred data, the method determines whether the error is a single-bit error or a multiple-bit error, and either corrects the single-bit error or reports the multiple-bit error.

In accordance with the present invention, before any errors are corrected or reported, the codes used to correct and report errors in the transferred data are first checked to determine whether these codes were transferred from the remote memory to the buffer memory without an error.

Figure 2:
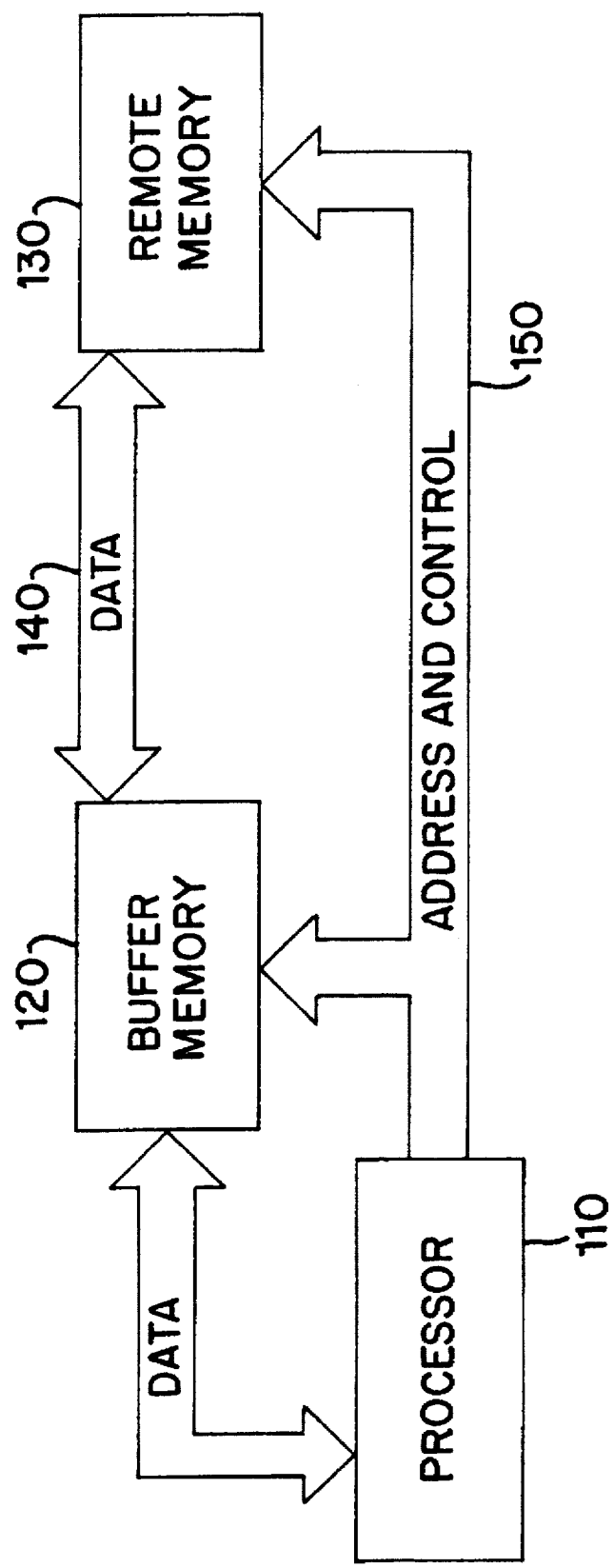
FIG. 2 is a block diagram illustrating the hardware required to implement the method of the present invention.

FIG. 2 shows a block diagram that illustrates the hardware required to implement the method of the present invention.

As shown in FIG. 2, a processor 110 transfers data between a buffer memory 120 and a remote memory 130 via a data bus 140 in response to a plurality of address and control signals transferred over an address and control bus 150. In the present invention, buffer memory 120 can be, for example, a cache memory.

Referring now to FIGS. 1A-1B, the method of the present invention begins at step S1 with processor 110 storing a sector of data (512 bytes) in buffer memory 120. In the preferred embodiment, the data is stored as 256 words and is further logically divided into two 128 word (256 byte) fragments.

Next, as shown in step S2, processor 110 forms a first error code, which covers the data, by calculating a row syndrome and a corresponding column syndrome for each 128 word fragment. The row syndromes are utilized to determine which word (if any) contains an error, while the corresponding column syndromes are used to isolate the error to a specific bit.

The concept in forming a row syndrome is to form a series of parity groups that overlap in such a way that an error can be uniquely isolated. The steps required to produce a row syndrome are illustrated in Tables 1-2.

As shown in Table 1, which shows a 16 word fragment for illustrative purposes only, a row syndrome is first calculated by determining the even parity for each of the words in the table. As described, even parity means that the total number of binary ones in the data and parity columns adds up to an even number when counted. Odd parity is simply the inverse of this, and could have been used here as well.

Once a parity entry has been determined for each word in the table, a unique non-zero entry number is assigned to each parity entry. Table 1 shows binary numbers (and decimal equivalents) running from one to 16 for simplicity and convenience.

TABLE 1

Sample Data "Fragment"

| Binary Number | | | | Even Parity | Entry Number | |
|---|---|---|---|---|---|---|
| | | | | | Decimal | Binary |
| 0000 | 0000 | 0000 | 0000 | 0 | 1 | 0 0001 |
| 1011 | 0011 | 1000 | 1111 | 0 | 2 | 0 0010 |
| 1101 | 1110 | 1010 | 1101 | 1 | 3 | 0 0011 |
| 1011 | 1101 | 1101 | 1111 | 1 | 4 | 0 0100 |
| 1010 | 0101 | 1100 | 0011 | 0 | 5 | 0 0101 |
| 1000 | 0100 | 0010 | 0001 | 0 | 6 | 0 0110 |
| 1110 | 1100 | 1000 | 0100 | 1 | 7 | 0 0111 |
| 1111 | 1110 | 1100 | 1000 | 0 | 8 | 0 1000 |
| 1011 | 0001 | 1010 | 0010 | 1 | 9 | 0 1001 |
| 1010 | 0010 | 1110 | 0010 | 1 | 10 | 0 1010 |
| 1110 | 0000 | 1010 | 0100 | 0 | 11 | 0 1011 |
| 1111 | 1101 | 0100 | 0001 | 1 | 12 | 0 1100 |
| 0000 | 0000 | 0000 | 0000 | 1 | 13 | 0 1101 |
| 1111 | 0111 | 0101 | 0001 | 0 | 14 | 0 1110 |
| 0000 | 1111 | 0011 | 1100 | 0 | 15 | 0 1111 |
| 0010 | 1001 | 0110 | 0101 | 1 | 16 | 1 0000 |

In the present method, the column of even parity bits in Table 1 forms an initial parity group. The initial parity group, in turn, is replicated a number of times to form a series of initial parity groups which are shown as columns S<4>–S<0> in Table 2. The number of replications is based on the number of bit positions in the binary entry number which, in turn, is based on the number of entries in the table. Since the binary entry number in Table 1 has five bit positions to cover 16 entries, the column of even parity bits from Table 1 is replicated five times, thereby forming five initial parity groups.

Further, each column S<4>–S<0> in Table 2 corresponds to one column of bit positions in the binary entry number. In the present example, column S<0> corresponds to the column of least significant bit positions of the binary entry number, while column S<1> corresponds to the column of next to the least significant bit positions.

The binary entry numbers provide a convenient way of defining a final parity group from each initial parity group. Where the bit is a "one" in the binary entry number, the corresponding entry in the corresponding column belongs to the final group defined by that column.

TABLE 2

Row Syndrome Calculation for Sample Fragment

Row Syndrome Bit Calculation
Each column here replicates the
parity column from the previous
table, with the significant
entries for each syndrome bit
highlighted.

| S<4> | S<3> | S<2> | S<1> | S<0> | Entry Number | |
|---|---|---|---|---|---|---|
| | | | | | Decimal | Binary |
| 0 | 0 | 0 | 0 | 0 | 1 | 0 0001 |
| 0 | 0 | 0 | 0 | 0 | 2 | 0 0010 |
| 1 | 1 | 1 | 1 | 1 | 3 | 0 0011 |
| 1 | 1 | 1 | 1 | 1 | 4 | 0 0100 |
| 0 | 0 | 0 | 0 | 0 | 5 | 0 0101 |
| 0 | 0 | 0 | 0 | 0 | 6 | 0 0110 |
| 1 | 1 | 1 | 1 | 1 | 7 | 0 0111 |
| 0 | 0 | 0 | 0 | 0 | 8 | 0 1000 |
| 1 | 1 | 1 | 1 | 1 | 9 | 0 1001 |
| 1 | 1 | 1 | 1 | 1 | 10 | 0 1010 |
| 0 | 0 | 0 | 0 | 0 | 11 | 0 1011 |
| 1 | 1 | 1 | 1 | 1 | 12 | 0 1100 |
| 1 | 1 | 1 | 1 | 1 | 13 | 0 1101 |
| 0 | 0 | 0 | 0 | 0 | 14 | 0 1110 |
| 0 | 0 | 0 | 0 | 0 | 15 | 0 1111 |
| 1 | 1 | 1 | 1 | 1 | 16 | 1 0000 |
| 1 | 0 | 0 | 1 | 0 | ← Syndrome Result | |

Thus, each entry in each column of binary entry numbers is evaluated to determine which entries contain a "one". Each time an entry in a column of entry numbers has a "one", the corresponding entry in the column of parity bits is marked.

For example, the first, third, fifth, seventh, ninth, eleventh, thirteenth, and fifteenth entries in the column of least significant bit positions contain a "one". As a result, the first, third, fifth, seventh, ninth, eleventh, thirteenth, and fifteenth entries in column S<0> have been marked.

Similarly, the second, third, sixth, seventh, tenth, eleventh, fourteenth, and fifteenth entries in the column of next to least significant bit positions contain a "one". As a result, the second, third, sixth, seventh, tenth, eleventh, fourteenth, and fifteenth entries in column S<1> have been marked.

Following this, the row syndrome is determined by calculating the parity of each column of marked parity bit positions. Thus, since column S<0> has an even number of marked "ones" (four), the row syndrome bit for column S<0> is zero. Similarly, since column S<1> has an odd number of marked "ones" (three), the row syndrome bit for column S<0> is one.

As discussed above, the number of bits in the row syndrome is dependent of the number of data words in the table. In the example shown in Table 1, five row syndrome bits are required to identify 16 data words. However, to cover the 128 data words of each fragment, as in the preferred embodiment, eight syndrome bits are required for each fragment. As a result, the row syndromes for each sector (two fragments) require two bytes of storage space.

The column syndrome also works by defining bit groups and calculating parity over them. In this case, however, the groups are not overlapping. This results in a syndrome that is less "efficient" (more bits are required), but much simpler to encode and decode.

The steps required to produce a column syndrome are illustrated in Table 3. As shown in Table 3, which shows the same 16 word fragment as in Table 1, each column of data forms a parity group. Thus, the column syndromes are determined by calculating the even parity of each column of data.

For example, since the column corresponding to the least significant bit position of the data entry has an even number of "ones" (eight), the column syndrome bit is zero. Similarly, since the column corresponding to the next to least significant bit position has an odd number of "ones" (five), the column syndrome bit is one.

In addition, it is noted that the number of bits in the column syndrome is independent of the number of data words in the table. Thus, since there are 16 data bits in each word, there are 16 bits (one byte) in the syndrome. As a result, the column syndromes for each sector (two fragments) require four bytes (two words) of storage space.

Returning again to FIGS. 1A–1B, after the row and column syndromes have been calculated on the data stored in buffer memory 120, processor 110 next forms a second error code to protect the row and column syndromes in step S3. In the preferred embodiment, a modified Hamming code is utilized to form the second error code. The Hamming code is modified by placing all of the parity bits to the left of the most significant data bit as opposed to inserting the parity bits within the data bits as is conventionally done. As described, the modified Hamming code requires three bytes of storage space per fragment, or six bytes of storage space per sector.

Next, at step S4, processor 110 forms a third error code by calculating a conventional two-byte checksum to cover each sector of data words (two fragments). Following this, at step S5, processor 110 stores the sector of data, and the row and column syndromes, the modified Hamming codes, and the checksum that correspond with the sector of data in remote memory 130.

In the preferred embodiment, remote memory 130 is implemented with an NM29N16 NAND flash memory manufactured by National Semiconductor Corporation. The NM29N16 NAND flash memory contains eight "spare" bytes per every 256 byte page of memory, or 16 spare bytes per every 512 byte sector.

As noted above, three bytes of storage space are required to store the syndromes for each fragment. Thus, six bytes of storage space are required to store the syndromes for each sector. In addition, three bytes of storage space are required to store the modified Hamming codes for the row and column syndromes for each fragment. Thus, six bytes of storage space are required to store the modified Hamming codes for each sector. Further, as also noted above, two bytes of storage space are required to store the checksum for each sector.

As a result of the above, 14 bytes of storage space are required in the present invention to store all of the error codes for each sector. Since the NM29N16 NAND flash memory provides 16 bytes of spare storage space per sector, all of the error codes for each sector can be stored in the NM29N16 NAND flash memory without consuming any of the data storage area.

Returning again to FIGS. 1A–1C, the method waits at step S6 until a request to read the sector data is received by processor 110. After a request to read has been received, processor 110 determines whether the sector of data is still stored in buffer memory 120 at step S7.

If the sector of data is still stored in buffer memory 120, processor 110 retrieves the required data from buffer memory 120 at step S8. However, if the sector of data is no longer stored in buffer memory 120, processor 110 transfers and stores the sector of data, and the row and column syndromes, the modified Hamming codes, and the checksum that correspond with the sector, to buffer memory 120 from remote memory 130 at step S9.

Following this, at step S10, processor 110 calculates a checksum from the sector of data stored in buffer memory 120, and then compares the calculated checksum with the checksum stored in buffer memory 120 at step S11. If the checksums match at step S12, the method continues with normal processing at step S13. If the checksums do not match, then an error is indicated.

However, prior to identifying the error, the method of the present invention calculates a Hamming code from the row and column syndromes stored in buffer memory 120, and then compares the calculated Hamming codes with the Hamming codes stored in buffer memory 120 at step S14.

If the Hamming codes do not match at step S15, then processor 110 evaluates the Hamming codes to determine if a single error or a multiple error has occurred at step S16. If a single error has occurred, the error is corrected at step S17. If multiple errors have occurred, the data is marked as corrupted at step S18.

However, if the Hamming codes match, then the method of the present invention moves to step S19 where the row and column syndromes are calculated by processor 110 for the sector of data stored in buffer memory 120. Following this, at step S20, the calculated row and column syndromes are compared to the row and column syndromes stored in buffer memory 120.

Next, the syndromes are checked for errors at step S21. If multiple errors are indicated, the sector of data is marked as corrupted at step S18. If no error is indicated, normal processing continues at step S22. However, if a single error is indicated, processor 110 extracts the row and column address of the error from the row and column syndromes in steps S23 and S24.

The steps required to extract the row and column addresses of the error are illustrated in Tables 4–7. As shown in Table 4, which shows the same 16 word fragment shown in Table 1, assume, for example, that bit <7> in word number 10 changes from a "1" to a "0".

This error is highlighted in Table 4. Notice also how this error inverts the parity bit associated with that word. From there, the changes propagate down into the row syndrome too, as shown in Table 5. Bits <1> and <3> of the binary code for entry number 10 contain "1"s, so the marked "1"s in columns S<3> and S<1> becomes marked "0"s. Hence those specific bits in the row syndrome are also changed by the error.

TABLE 4

Sample Fragment with Single Bit Error Introduced

| Binary Number | | | | Even Parity | Entry Number Decimal | Binary |
|---|---|---|---|---|---|---|
| 0000 | 0000 | 0000 | 0000 | 0 | 1 | 0 0001 |
| 1011 | 0011 | 1000 | 1111 | 0 | 2 | 0 0010 |
| 1101 | 1110 | 1010 | 1101 | 1 | 3 | 0 0011 |
| 1011 | 1101 | 1101 | 1111 | 1 | 4 | 0 0100 |
| 1010 | 0101 | 1100 | 0011 | 0 | 5 | 0 0101 |
| 1000 | 0100 | 0010 | 0001 | 0 | 6 | 0 0110 |
| 1110 | 1100 | 1000 | 0100 | 1 | 7 | 0 0111 |
| 1111 | 1110 | 1100 | 1000 | 0 | 8 | 0 1000 |
| 1011 | 0001 | 1010 | 0010 | 1 | 9 | 0 1001 |
| 1010 | 0010 | 0̲110 | 0010 | 0̲ | 10 | 0 1010 |
| 1110 | 0000 | 1010 | 0100 | 0 | 11 | 0 1011 |
| 1111 | 1101 | 0100 | 0001 | 1 | 12 | 0 1100 |
| 0000 | 0000 | 0010 | 0000 | 1 | 13 | 0 1101 |
| 1111 | 0111 | 0101 | 0001 | 0 | 14 | 0 1110 |
| 0000 | 1111 | 0011 | 1100 | 0 | 15 | 0 1111 |
| 0010 | 1001 | 0110 | 0101 | 1 | 16 | 1 0000 |

TABLE 5

Re-Calculated Row Syndrome of Sample Fragment with Error

| Row Syndrome Bit Calculation | | | | | Entry Number | |
|---|---|---|---|---|---|---|
| S<4> | S<3> | S<2> | S<1> | S<0> | Decimal | Binary |
| 0 | 0 | 0 | 0 | 0̲ | 1 | 0 0001 |
| 0 | 0 | 0 | 0̲ | 0 | 2 | 0 0010 |
| 1 | 1 | 1 | 1̲ | 1̲ | 3 | 0 0011 |
| 1 | 1 | 1̲ | 1 | 1 | 4 | 0 0100 |
| 0 | 0 | 0̲ | 0 | 0̲ | 5 | 0 0101 |
| 0 | 0 | 0̲ | 0̲ | 0 | 6 | 0 0110 |
| 1 | 1 | 1̲ | 1̲ | 1̲ | 7 | 0 0111 |
| 0 | 0̲ | 0 | 0 | 0 | 8 | 0 1000 |
| 1 | 1̲ | 1 | 1 | 1̲ | 9 | 0 1001 |
| 0 | 0̲ | 0 | 0̲ | 0 | 10 | 0 1010 |
| 0 | 0̲ | 0 | 0̲ | 0̲ | 11 | 0 1011 |
| 1 | 1̲ | 1̲ | 1 | 1̲ | 12 | 0 1100 |
| 1 | 1̲ | 1̲ | 1 | 1̲ | 13 | 0 1101 |
| 0 | 0̲ | 0̲ | 0 | 0̲ | 14 | 0 1110 |
| 0 | 0̲ | 0̲ | 0̲ | 0̲ | 15 | 0 1111 |
| 1̲ | 1 | 1 | 1 | 1 | 16 | 1 0000 |
| 1 | 1̲ | 0 | 0̲ | 0 | ← Syndrome Result | |

Likewise, the error changes the column syndrome, as shown in Table 6. The error is in data bit <7>, so the corresponding bit of the column syndrome is changed.

TABLE 6

Re-Calculated Column Syndrome of Sample Fragment with Error

| Binary Data | | | | |
|---|---|---|---|---|
| | 0000 | 0000 | 0000 | 0000 |
| | 1011 | 0011 | 1000 | 1111 |
| | 1101 | 1110 | 1010 | 1101 |
| | 1011 | 1101 | 1101 | 1111 |
| | 1010 | 0101 | 1100 | 0011 |
| | 1000 | 0100 | 0010 | 0001 |
| | 1110 | 1100 | 1000 | 0100 |
| | 1111 | 1110 | 1100 | 1000 |
| | 1011 | 0001 | 1010 | 0010 |
| | 1010 | 0010 | 0̲110 | 0010 |
| | 1110 | 0000 | 1̲010 | 0100 |
| | 1111 | 1101 | 0100 | 0001 |
| | 0000 | 0000 | 0010 | 0000 |
| | 1111 | 0111 | 0101 | 0001 |
| | 0000 | 1111 | 0011 | 1100 |
| | 0010 | 1001 | 0110 | 0101 |
| Column-Wise Parity | 0011 | 1100 | 0̲101 | 1110 |

An error can now be detected by comparing the calculated row and column syndromes, which include the error, with the row and column syndromes stored in buffer memory 120, which do not include the error. The pattern of the differences indicates where the error is. The exclusive-OR function is handy for finding the difference between the two values, because it returns a "1" in each bit position where a difference exists.

Table 7 shows the row and column syndromes calculated both "before" and "after" the error occurred. It also shows the result of an exclusive-OR operation on each set. The row result correctly points to faulty word entry 10, and the column result forms a mask which correctly flags bit <7>. Correcting the error is accomplished simply by exclusive-ORing the entry indicated with the column mask as shown in step S25.

TABLE 7

Comparison of Syndromes "Before" and "After" Error

| | Row Syndromes | Column Syndromes | | | |
|---|---|---|---|---|---|
| "Before" | 1 0010 | 0011 | 1100 | 1101 | 1110 |
| "After" | 1 1000 | 0011 | 1100 | 0101 | 1110 |
| Exclusive OR Result → | 0 1010 | 0000 | 0000 | 1000 | 0000 |

Extensive testing with NAND flash devices reveals that most read failures are single-bit failures. Further, the failure mode tends to change a "1" to a "0".

Note that the row and column syndromes can not correct multiple bit failures, but they can detect most multiple bit failures. Examine the results in Table 7 and note that there is exactly one bit set in the column result. Whenever more than one bit is set, this is an indication that multiple errors have occurred. Similarly, if the row result ever forms a non-valid entry number, this also indicates that multiple errors have occurred.

In addition, both the row and column results must always agree: either both must show an error, or both must show no error. If there is ever a discrepancy here, this too is an indication that multiple errors have occurred.

In addition, note that if no error has occurred, as in step S22, the row and column results will both equal zero (because no change in any group is indicated).

Although effective, the syndrome calculations are processor-intensive. Thus, the present invention reduces the processor load and performance load on read operations (the most common), by calculating the syndromes only when there is reason to believe that an error has occurred as indicated by the checksum.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A method for detecting and correcting read errors in a sector of data, the method comprising the steps of:

transferring data from a remote memory to a buffer memory, the data including a sector of stored user data, a stored first error code usable in correcting an error in the sector of stored user data, a stored second error code usable in correcting an error in the stored first error code, and a stored third error code usable in detecting an error in the sector of stored user data;

forming a calculated third error code from the sector of stored user data;

comparing the calculated third error code to the stored third error code;

forming a calculated second error code from the stored first error code if the calculated third error code does not match the stored third error code; and comparing the calculated second error code to the stored second error code to detect an error in the stored second error code.

2. The method of claim 1 and further comprising the steps of:

forming a calculated first error code from the sector of stored user data when the calculated second error code and the stored second error code match; and comparing the calculated first error code with the stored first error code to detect an error in the sector of stored user data.

3. The method of claim 2 and further comprising the step of correcting the error in the sector of stored user data when the step of comparing the calculated first error code indicates that a single-bit error is present.

4. The method of claim 3 wherein the stored first error code includes a row syndrome and a column syndrome.

5. The method of claim 3 wherein the stored second error code includes a Hamming code.

6. The method of claim 3 wherein the stored third error code includes a checksum.

7. The method of claim 2 and further comprising the step of marking the sector of stored user data as corrupted when the step of comparing the calculated first error code indicates that a multiple-bit error is present.

8. The method of claim 7 wherein the stored first error code includes a row syndrome and a column syndrome.

9. The method of claim 7 wherein the stored second error code includes a Hamming code.

10. The method of claim 7 wherein the stored third error code includes a checksum.

11. The method of claim 1 and further comprising the step of correcting the error in the stored second error code if the calculated second error code does not match the stored second error code.

12. The method of claim 11 and further comprising the steps of:

forming a calculated first error code from the sector of stored user data; and comparing the calculated first error code with the stored first error code to detect an error in the sector of stored user data.

13. The method of claim 12 and further comprising the step of correcting the error in the sector of stored user data when the step of comparing the calculated first error code indicates that a single-bit error is present.

14. The method of claim 13 wherein the stored first error code includes a row syndrome and a column syndrome.

15. The method of claim 13 wherein the stored second error code includes a Hamming code.

16. The method of claim 13 wherein the stored third error code includes a checksum.

17. The method of claim 12 and further comprising the step of marking the sector of stored user data as corrupted when the step of comparing the calculated first error code indicates that a multiple-bit error is present.

18. The method of claim 17 wherein the stored first error code includes a row syndrome and a column syndrome.

19. The method of claim 17 wherein the stored second error code includes a Hamming code.

20. The method of claim 17 wherein the stored third error code includes a checksum.

* * * * *